United States Patent
Schoch et al.

(10) Patent No.: US 6,460,140 B1
(45) Date of Patent: Oct. 1, 2002

(54) SYSTEM FOR CONTROLLING THE USE OF LICENSED SOFTWARE

(75) Inventors: Steven Karl Schoch, Sunnyvale, CA (US); Paul Swart, San Jose, CA (US)

(73) Assignee: Starnet Communications Corporation, Sunnyvale, CA (US)

( * ) Notice: Subject to any disclaimer, the term of this patent is extended or adjusted under 35 U.S.C. 154(b) by 0 days.

(21) Appl. No.: 09/475,959

(22) Filed: Dec. 30, 1999

(51) Int. Cl.[7] .............................................. G06F 12/14
(52) U.S. Cl. ......................... 713/200; 713/202; 705/59
(58) Field of Search ................................ 713/202, 200; 705/57, 58, 59, 18; 709/229, 312, 203; 340/825.31, 825.34; 710/200

(56) References Cited

U.S. PATENT DOCUMENTS

| | | | |
|---|---|---|---|
| 4,941,174 A | 7/1990 | Enescu et al. | |
| 5,103,476 A | 4/1992 | Waite et al. | |
| 5,204,897 A | * 4/1993 | Wyman | ........................ 380/4 |
| 5,222,134 A | 6/1993 | Waite et al. | |
| 5,319,705 A | 6/1994 | Halter et al. | |
| 5,337,357 A | 8/1994 | Chou et al. | |
| 5,457,746 A | 10/1995 | Dolphin | |
| 5,490,216 A | 2/1996 | Richardson, III | |
| 5,553,139 A | 9/1996 | Ross et al. | |
| 5,586,186 A | 12/1996 | Yuval et al. | |
| 5,636,277 A | 6/1997 | Nagahama | |
| 5,745,879 A | 4/1998 | Wyman | |
| 5,758,068 A | * 5/1998 | Brandt et al. | ................ 395/186 |
| 5,758,069 A | 5/1998 | Olsen | |
| 5,790,664 A | * 8/1998 | Coley et al. | .................... 380/4 |
| 5,805,699 A | * 9/1998 | Akiyama et al. | ............... 380/4 |
| 5,864,620 A | 1/1999 | Pettitt | |
| 5,968,175 A | * 10/1999 | Morishita et al. | ........... 713/200 |

* cited by examiner

Primary Examiner—James P. Trammell
Assistant Examiner—Pierre E. Elisca
(74) Attorney, Agent, or Firm—Townsend and Townsend and Crew LLP

(57) ABSTRACT

A system is described for controlling the distribution of licensed software. The system includes a license registration database which may be contacted by a user using a web browser, e-mail, or another approach, to provide to that system a registration key. The registration key is obtained by the user from the vendor of the software product, who in turn records it in the license registration database. In response to the registration key, the license registration database unlocks the software, allowing use of the software by the user on the user's system. By incorporating into the request from the user unique information about the user's system, distribution of the software beyond the user's system is limited or precluded, as specified by the vendor.

10 Claims, 3 Drawing Sheets

SYSTEM FOR CONTROLLING THE USE OF LICENSED SOFTWARE

BACKGROUND OF THE INVENTION

This invention relates to a system for controlling the use of software licensed to a user for use on a user's system. In particular it relates to a system which permits the software publisher to control copying of the software it licenses to preclude users from giving away "free" copies to others.

With advances in computing power and increasing research and development costs, sophisticated software is now widely available even for use on personal computers. Such software is highly portable, being easily disseminated over the Internet, or distributed by CD-ROM or other means. This, unfortunately has resulted in widespread unauthorized copying of licensed software. Because of the considerable costs of research, development, marketing, etc., the software publisher desires to prevent such unauthorized copying, and to control the use of the software in accordance with the terms of the license.

The publisher of software typically licenses a user to a use the software on a single system, and to make a back-up copy. The user, on the other hand, sometimes chooses to ignore the license terms and use the licensed software on many systems, or provide free copies to friends etc. This is a major problem with many game programs, and is a significant problem with many types of conventional business software. In view of the huge size of the software market, it is not surprising that many solutions have been proposed for controlling the use of such software to prevent unauthorized copying.

One approach, often used with expensive programs, is to provide a hardware device, commonly called a dongle, which the user attaches to the computer upon which the software is to operate. Each time the software runs on that computer, it checks to see if the hardware device is present. If the hardware device is not present, then the software does not operate. The hardware device typically includes something, for example, an integrated circuit, which is difficult or expensive for users to counterfeit. Unfortunately, an undesirable side-effect of this approach is that the cost of the dongle adds an additional $10 to $25 per license for use of the software. It also adds overhead to the management of the licenses, because user's devices occasionally malfunction requiring replacement with a new appropriate code numbered dongle. Furthermore, many software companies do not have engineering capabilities for manufacturing such dongles in-house. Such solutions also cause fears of inconvenience in the consumer.

Other systems provide key numbers which may be unique to a user, but are not restricted to the user's system. Before the software can operate the user must enter the appropriate key, for example, a number on a floppy disk or CD-ROM provided with the software. Such systems are easily circumvented by passing along the key number with the copy of the software.

Still other techniques employ encryption technology to make duplication of the software more difficult, and preclude copying with ordinary operating system copy techniques. Without the proper encryption software, the user is unable to make a functional copy of the software provided by the publisher.

Another approach used on some network software is to control the number of users on a system. In such systems, a business is licensed to have a previously agreed upon number of copies of a particular piece of software operating from a server at any given time. As each user logs in or out of using the program, their presence is counted, and appropriate controls are applied through the server to assure that the number of users at any given time does not exceed the license limit.

The end result of the approaches discussed above is that no low-cost system really provides satisfactory protection to the software publisher, or the needed flexibility to the user.

SUMMARY OF THE INVENTION

This invention provides a unique system and method for controlling the distribution of software under a license agreement. By identifying the computer utilized by the licensee and specifically aligning this computer with the software being licensed, the licensor is able to prevent unauthorized duplication of the licensed software. The licensor may allow the licensee to utilize the software on more than one computer, but in this case, the licensor is able to specifically determine the number of computers on which the software will be allowed to operate. For marketing purposes, the licensor may also allow the software to operate in a demonstration mode on computers other than the one(s) specifically identified and aligned with the licensed software.

In contrast to prior art, the approach of this invention results in a very low cost per licensee for controlling the distribution of licensed software. The license registration process is fully automated, eliminates the need for additional encryption software or telephone calls to and from the user to obtain validation numbers or the like. The registration process itself is almost completely transparent to the user, and the system provided is easy to integrate into existing applications. At the licensor's option, the registration process can be completely anonymous, protecting the licensee's right of privacy by not requiring personal data as a condition of being licensed to use the software.

In the preferred embodiment the use of the licensed software is restricted to one computer; however, the licensor may choose to provide the licensee with additional license(s) for back-up purposes, and/or to also utilize the software on a specific number of additional computers—such as a portable computer or on multiple computers in homes, offices and other settings. Once the software has been loaded on the maximum number of computers allowed by the licensor, and until the licensee obtains additional license(s), the software may be authorized to be utilized on additional computers in a demonstration mode. The demonstration mode generally will be a less than fully functional version of the original version, because it will contain only a subset of the features of the fully functional version, or will only work for a short period of time in a fully functional mode.

In a preferred embodiment a method of controlling reproduction of software by an end user of the software includes providing to an entity that licenses its software to users, license generation software which, when operated, generates validation numbers, there being a unique validation number for each copy of the software to be separately licensed. The validation number is included with the software when supplied from the licensor, and this number is incorporated with additional product information and provided to a license registration database.

When the user installs the software on the designated system(s), he registers the software by entering the validation number, plus a password that he creates. At this time the system registration software, for example, as provided by AnchorSoft, also obtains the system identification number.

This information is sent to the online Anchorsoft registration database, and, after successful verification, a license key is stored on the user's computer. This computer can now fully operate the licensed software.

DESCRIPTION OF THE SPECIFIC EMBODIMENTS

Figure 1:
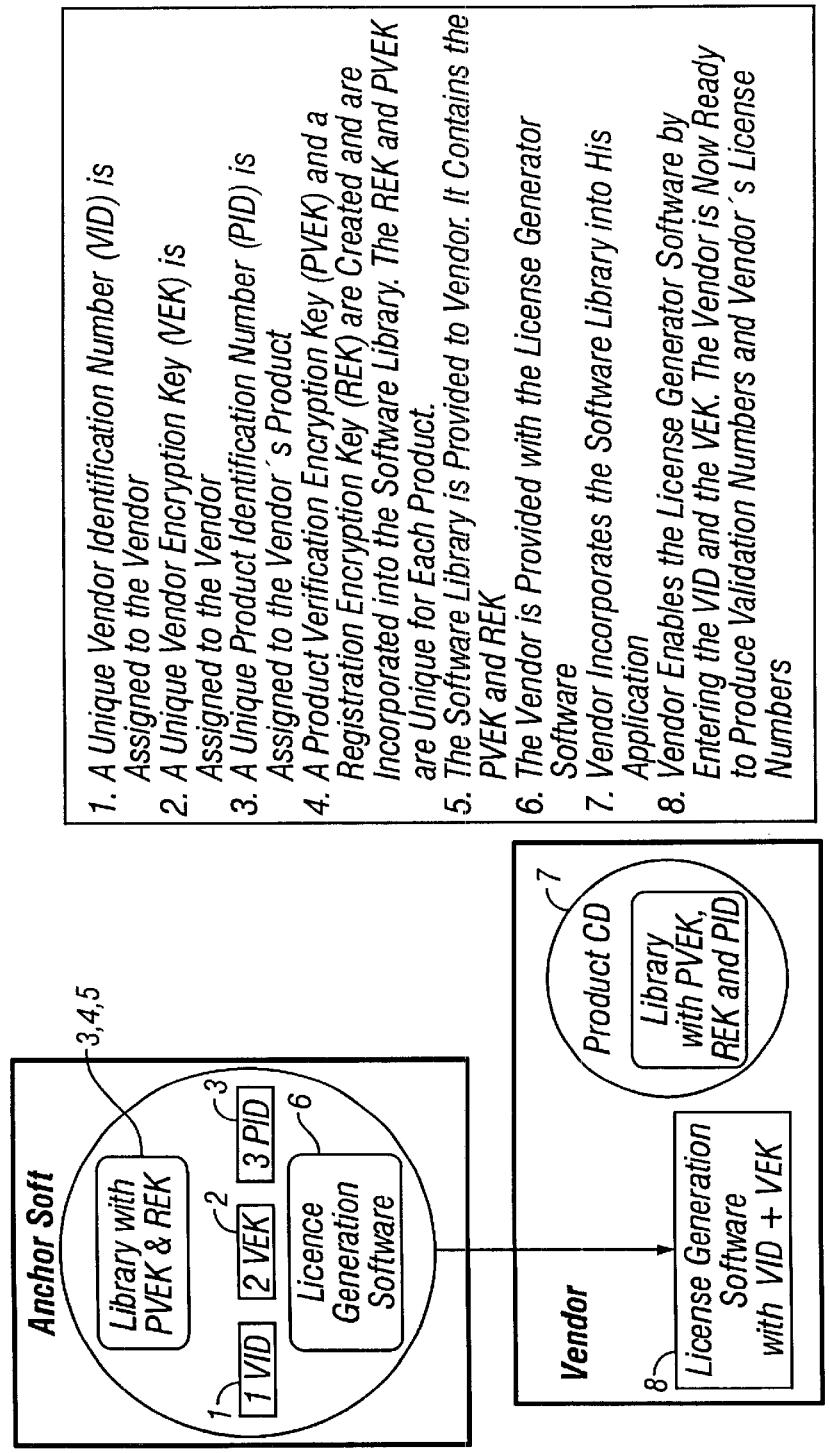
FIG. 1 is a diagram illustrating the process of registering a vendor's product with registration database.

FIG. 1 is a diagram illustrating the relationship between a vendor who provides software under license, and a service provider who implements a preferred embodiment of the system of this invention. The vendor is labeled as such, while the service provider is designated "AnchorSoft." a tradename of the assignee. The service provider creates a unique vendor identification number or designation (VID), a unique product identification number (PID), and a unique vendor encryption key (VEK). The service provider also maintains a library with product verification encryption keys (PVEK) and registration encryption keys (REK). In addition, the service provider has license generation software. The license generation software is software configured to accept the data referred to above, and in response generate a unique validation number for use with system of this invention.

As shown in FIG. 1, the system registers a vendor's product by assigning a unique vendor identification number, a unique product identification number and a unique vendor encryption key. If the vendor is using the system to control licenses for more than a single product, the VID and VEK remain constant for that particular vendor; however, the PID will change to account for each new product.

The license generation software including the VID and VEK are provided to the vendor. In addition, the vendor also receives a product CD which contains a library including the PVEK, the REK, and the PID. To use the license generation software, the vendor enters the VID and the VEK. By doing so, the vendor is now ready to produce validation numbers and vendors' license numbers for use as described below.

Figure 2:
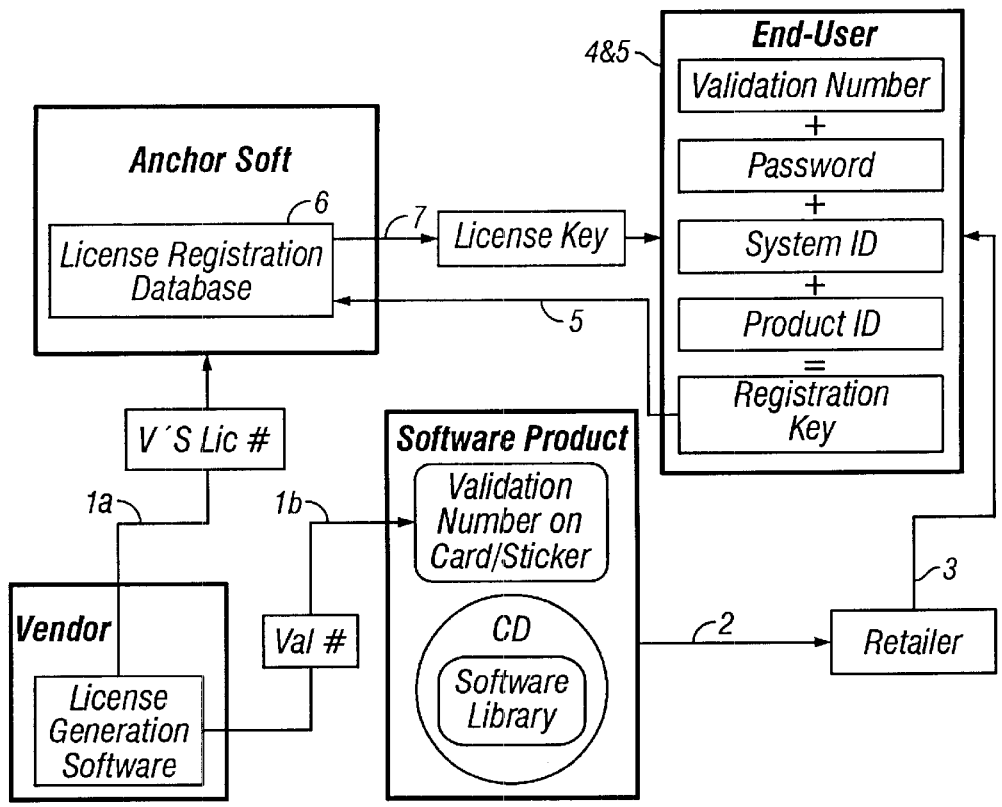
FIG. 2 is a diagram illustrating the licensing process employed in a preferred embodiment of this invention.

As shown in FIG. 2, the vendor generates software licenses in the following manner: The vendor uses the license generator software to generate licenses. Each license has two numbers, which are generated as a pair. The validation number consists of a unique serial number (for this product) and a random number. The vendor's license number consists of the validation number plus the PID, VID, maximum number of license keys, and options. Options can be used, at the vendor's option, to enable certain features in the software product, set an upgrade 'timestamp', or other uses. The vendor's license number is encrypted using the vendor encryption key and is sent to AnchorSoft, where, after validation, it is inserted into the license database.

Next consider the end user. At the time the end user acquires the software from the retailer or other source, the end user receives the validation number accompanying that software. To register the software and "unlock" it for use on his computer(s), the user submits the validation number, together with a password chosen by the user to the software library through the registration option interface.

The software library combines this data with the system identification number (SID) to generate a "registration key." The user then contacts the license registration database at AnchorSoft by employing a web browser or other well-known modem software. The registration key is encrypted using the registration encryption key, and is then submitted to the license registration database. After successful verification of the registration key, the license database generates a license key, which consists of the PID, the SID and the options, and encrypts it using the product verification encryption key. The registration library receives the license key and stores it on the user's computer. If the verification library cannot verify the stored license key, then the software will, at the licensor's option, not operate, or only operate in demonstration mode.

As indicated by the figure, some of the information will be totally under the control of the end user, for example, the password. In contrast, other information, the system identification, will not be controlled at all by the end user, instead being provided from hardware in the user's computer. Examples of such hardware specific information include a unique number, such as the boot sector ID identifying the hard disk drive within the user's system, the network interface card ID, or a unique number identifying the microprocessor used in the system. Of course, if needed, another hardware dependent number identifying the user's computer can also be used provided it does not change frequently.

Although in the discussion above, the various numbers have been described as simple numbers, it will be appreciated that it is advantageous to employ encryption in establishing such numbers. In the preferred embodiment the Data Encryption Standard (DES) is used. For security and verification purposes, the vendor license number, registration key and license key are all encrypted utilizing DES.

This invention employs a variety of numbers. These numbers and the components contained within each are as follows:

Validation number=serial number & random number.

Vendor's license number=validation number & vendor ID & product ID & number of registrations & options. Encrypted with the vendor encryption key.

Registration key=serial number & random number & product ID & SID & user password. Encrypted with the registration encryption key.

License key=product ID & SID & options. Encrypted with the product verification encryption key.

Each vendor has a unique vendor ID.

Each product has a unique product ID.

Each product has a registration encryption key and a product verification encryption key.

Different products may have identical serial numbers.

Figure 3:
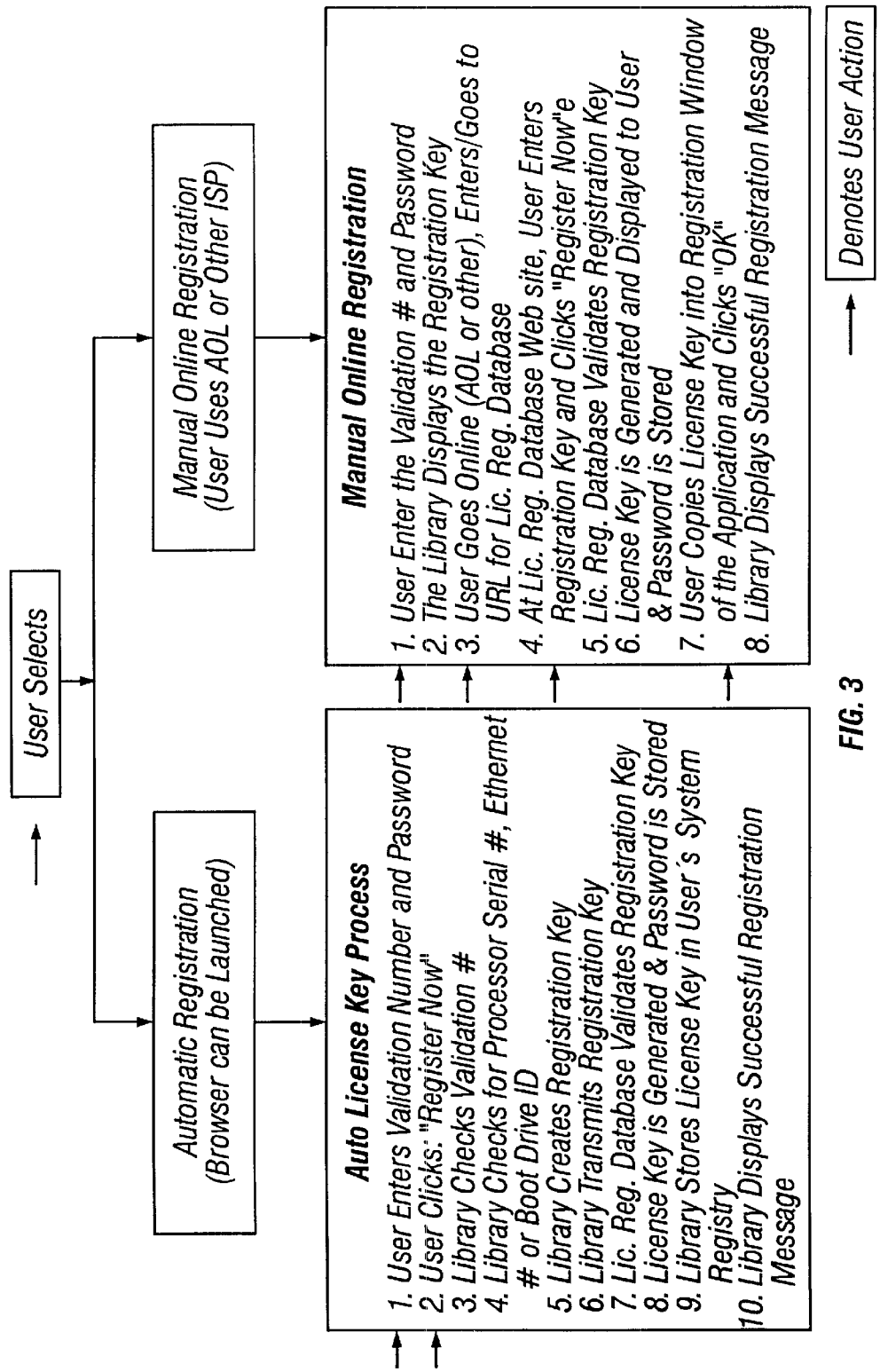
FIG. 3 is a diagram illustrating the online registration process.

FIG. 3 illustrates the manner in which the online registration process is performed. Steps performed by the user are shown with a small arrow beside them, while steps without an arrow are performed by the software in the license registration database. The user enters his validation number contained on his product and his self-generated password. The software library contained in the product verifies the validation number and obtains unique computer identification (typically the Ethernet number, processor serial number or boot drive ID). The software library creates a registration number and transmits this number to the AnchorSoft license registration database. The license registration database validates the registration number, stores the user password and creates a license key. The license key is transmitted back to the software library where it is stored in the user's system registry. The library will then display a successful registration message.

The system described above provides numerous advantages over prior art approaches. It eliminates loss of business caused by unauthorized duplication and distribution of licensed software by the user but still provides user with a fast and user friendly method of registration. The licensor is able to distribute his product in the partially disabled or time-limited demonstration version to potential buyers by placing the demonstration version on CD-ROM or other media, or by allowing the product to be downloaded from an online venue. The licensor can encourage licensed users to distribute the demonstration copy to others and thus enjoy the benefit of any subsequent pass-along sales. The licensor can use the information from the license registration database, to which AnchorSoft may provide access to the licensor, for sales tracking and forecasting.

The proceeding has been a description of the preferred embodiment of the invention. It will be appreciated that deviations and modifications can be made without departing from the scope of the invention, which is defined by appended claims.

What is claimed is:

1. A method of controlling reproduction of software by an end-user of the software, the method comprising:

providing to an entity that licenses its software to users, license generation software, which when operated generates validation numbers, there being a unique validation number for each copy of the software to be separately licensed;

a copy of the validation number being provided each of a license registration database and included with the software when supplied from the entity;

when the user installs a software on a designated system, determining a registration key formed from the unique validation number and additional information including a number related to the designated system, wherein software determines the number related to the designated system;

generating a license key number using the license registration database in response to the additional information provided, wherein the license key is generated in response to an on-line transaction; and using the license key number on the users system to unlock use of the software.

2. A method as claimed in claim 1 wherein the registration key includes both the user password and the number related to the designated system.

3. A method as claimed in claim 2 wherein the number related to the designated system comprises a number already stored on the hard disk drive in the user system.

4. A method as claimed in claim 2 wherein the number related to the designated system comprises a number already stored in a microprocessor in the user system.

5. A method as claimed in claim 2 wherein the number related to the designated system comprises a number derived from a network interface card installed in the user system.

6. A method as in claim 1 wherein the unique validation number comprises information identifying the entity, information identifying the product, and information identifying the particular product to which the unique validation number is applied.

7. A method as in claim 1 wherein the additional information includes a password created by the user.

8. A method as in claim 1 further comprising the step of also providing the unique validation number to a library containing other such validation numbers.

9. A method as in claim 8 wherein the validation number further includes a unique number not controlled by a vendor.

10. A method of controlling reproduction of software by an end-user of the software, the method comprising:

providing to an entity that licenses its software to users, license generation software, which when operated generates validation numbers, there being a unique validation number for each copy of the software to be separately licensed;

a copy of the validation number being provided each of a license registration database and included with the software when supplied from the entity;

when the user installs a software on a designated system, determining a registration key formed from the unique validation number and a user password created by the user;

verifying the registration key after transmitting the registration key to the license registration database;

generating a license key number using the license registration database; and using the license key number on the users system to unlock use of the software.

* * * * *